E. H. W. WEIBULL.
PLUMMER BLOCK FOR ANTIFRICTION BEARINGS.
APPLICATION FILED MAR. 12, 1919.
1,304,832.
Patented May 27, 1919.
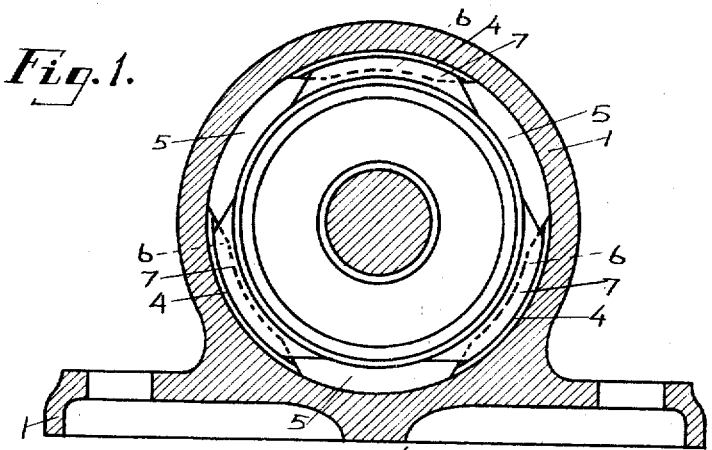
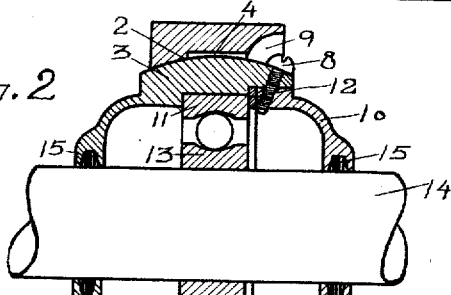
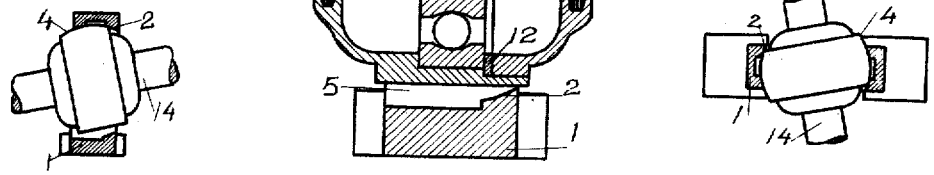
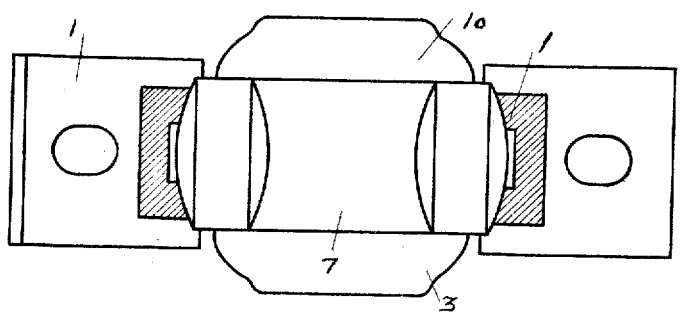
Inventor.
E. H. W. Weibull
By H. R. Kerslake
Atty.

UNITED STATES PATENT OFFICE.

ERNST HJALMAR WALODDI WEIBULL, OF GOTTENBORG, SWEDEN, ASSIGNOR TO NORDISKA KULLAGER AKTIEBOLAGET, OF GOTTENBORG, SWEDEN.

PLUMBER-BLOCK FOR ANTIFRICTION-BEARINGS.

1,304,832.     Specification of Letters Patent.    Patented May 27, 1919.

Application filed March 12, 1919. Serial No. 282,198.

*To all whom it may concern:*

Be it known that I, ERNST HJALMAR WALODDI WEIBULL, a subject of the King of Sweden, residing at Gottenborg, in the county of Gottenborg and Bohus and Kingdom of Sweden, have invented new and useful Improvements in Plumber-Blocks for Antifriction-Bearings, of which the following is a specification.

The present invention relates to bearing-frames and plumber-blocks and has for its object to render the bearing self-alining in relation to the center-line of the shaft. The invention is characterized mainly therein, that the bearing consists of a sleeve inclosing a ball-bearing or a roller-bearing and provided with spherical segments fitting against the bearing-frame, in which there are provided recesses in such a manner, that the bearing may freely be introduced into the frame from the side and afterward tilted, so as to prevent the bearing from becoming displaced in an axial direction.

In the annexed drawing—

Figure 1 shows a side-elevation of a complete bearing, partly in section.

Fig. 2 shows the bearing in a vertical longitudinal section.

Fig. 3 shows a view from above of the bearing.

Fig. 4 shows a vertical section of a plumber-block with the bearing-sleeve tilted out of its normal position.

Fig. 5 shows a horizontal section of the same parts.

The plumber-block denoted by 1 has its inner surfaces 2 turned spherically to the same radius with the center of the sphere coinciding with the center of the bearing proper. In the plumber-block 1 there is provided a bearing-sleeve 3, the exterior of which is shaped with spherical surfaces 4 fitting against the spherical surfaces 2 in the plumber-block 1. In one side of the plumber-block there are provided recesses 5 in such a manner, that they divide the spherical surfaces 2 into a plurality of segments 6. The spherical surfaces 4 in the bearing-sleeve 3 are also divided into segments 7 by similar recesses 5, suited in size to the segments 6 in the plumber-block 1.

The bearing-sleeve 3 is inserted into the plumber-block with its segments 7 in the recesses 5 of the plumber-block and is afterward turned, so that the surfaces 4 of these segments 7 fit against the surfaces 2 of the segments 6. In order to limit the pivoting of the bearing-sleeve 3 into the plumber-block one or several projections are provided, for instance screws 8, the heads of which are able to move somewhat in recesses 9 provided in the plumber-block 1. These screws 8 also serve as a means for securing a cover 10 fitted to the one side of the bearing-sleeve 3, so as to tightly close the interior of the sleeve 3. The holes in the bearing-sleeve 3, in which the screws 8 are inserted, may also serve as lubricating-holes for the bearing when removing one of the screws.

The bearing-sleeve 3 with its cover 10 is shaped so as to completely inclose the ball-bearing or roller-bearing thus forming a dust-proof protection or incasement. To increase the tightening-ability a soft washer 15 is provided in each end of the bearing-sleeve about the shaft 14 according to general practice.

In the bearing-sleeve 3 there is fitted a ball-bearing (or roller-bearing), the outer race ring 11 of which is fixed in the bearing-sleeve 3 by means of a tightening-washer 12 and the cover 10. The inner race ring 13 of the bearing is secured to the shaft 14.

The device described provides a very cheap self-alining bearing, which has proved to be capable of competing favorably with other self-alining ball-bearings and roller-bearings, notwithstanding its simple design. It is to be understood that the invention is not limited to the special design of plumber-block as illustrated in the drawing, but may be provided in combination with any arbitrary design of a bearing-block as for instance a hanging frame or other suitable shape of bearing support.

Having now particularly described and ascertained the nature of my said invention, and in what manner the same is to be performed, I declare, that what I claim is:

1. In a bearing block for anti-friction bearings, the combination of an undivided bearing frame provided with internal spherical segments separated by recesses, and a sleeve adapted to inclose the anti-friction bearings and provided with external segments, so that the sleeve may be freely introduced into the frame from the side and subsequently tilted so as to prevent the bearing from becoming displaced in an axial direction.

2. A bearing-block as claimed in claim 1, characterized therein, that the bearing-sleeve is provided with a cover encircling the shaft and inclosing the bearing-sleeve as a dust-proof protection.

3. A bearing-block as claimed in claim 2, characterized therein, that the dust proof closing cover of the sleeve is secured by means of one or several screws arranged so as also to serve as a stopping-device in order to limit the self-alining pivoting movements of the bearing-sleeve.

4. A bearing-block as claimed in claim 3, characterized therein, that the holes in the bearing-sleeve for the cover screw are bored right through in such a direction relatively to the bearing, that they may serve as lubricating-holes for the bearing.

In testimony whereof I have affixed my signature in presence of two witnesses.

ERNST HJALMAR WALODDI WEIBULL.

Witnesses:
SYLVESTER E. ROTHCHILD, Jr.,
E. JOHNSON.